D. W. WOOD.
TURRET MACHINE.
APPLICATION FILED DEC. 28, 1917.

1,288,351.

Patented Dec. 17, 1918.
5 SHEETS—SHEET 1.

WITNESSES

INVENTOR
David Wilson Wood
BY

ATTORNEYS

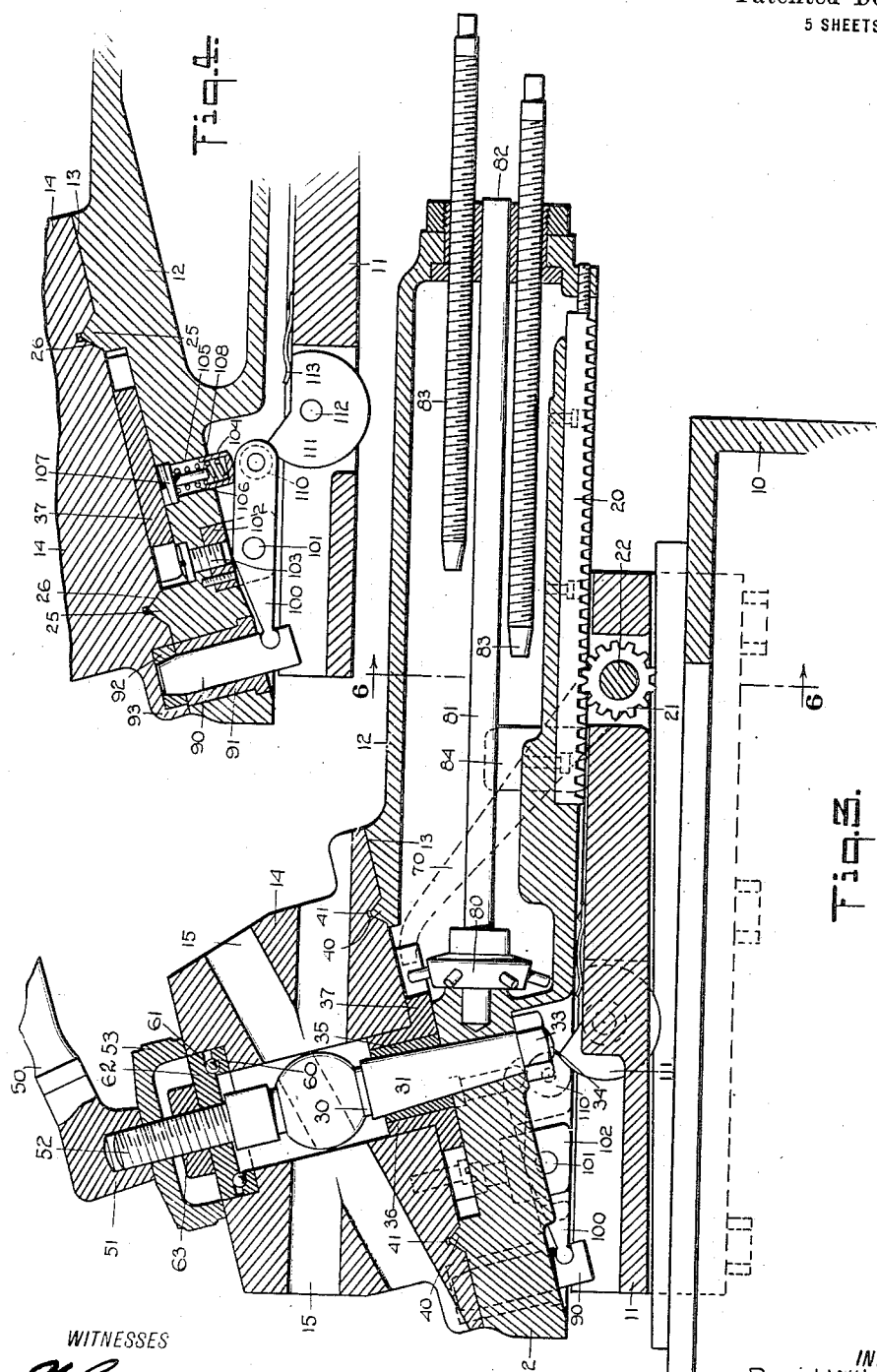

D. W. WOOD.
TURRET MACHINE.
APPLICATION FILED DEC. 28, 1917.
1,288,351.
Patented Dec. 17, 1918.
5 SHEETS—SHEET 3.
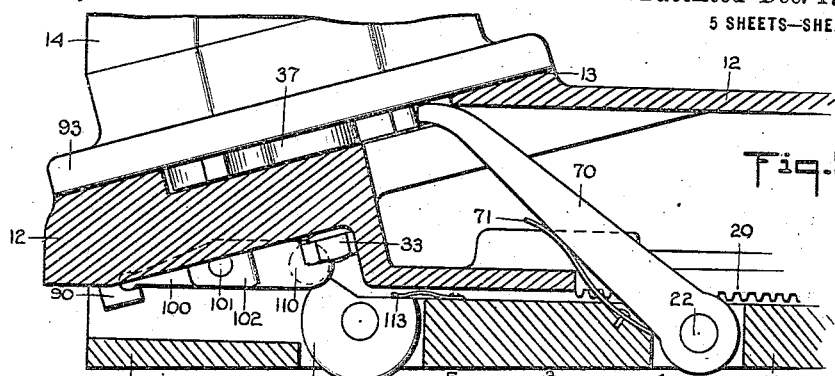
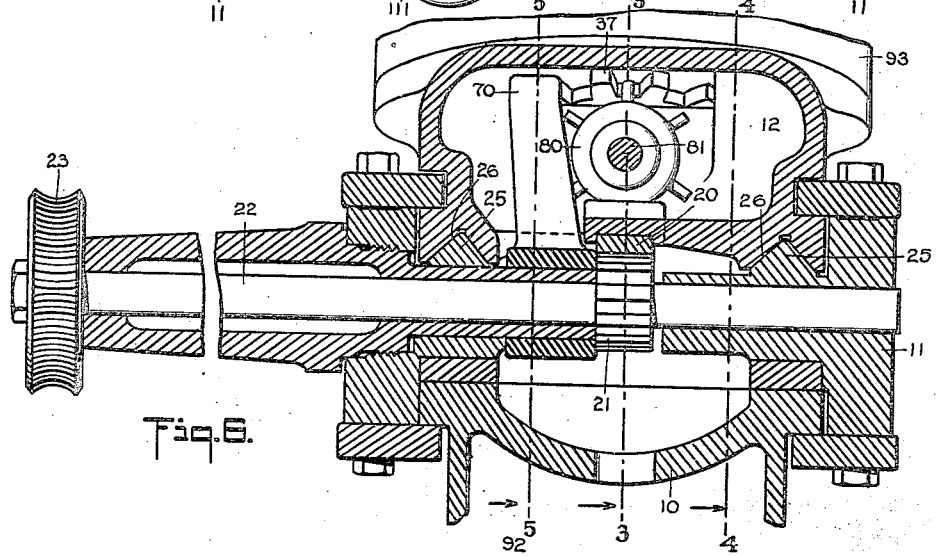
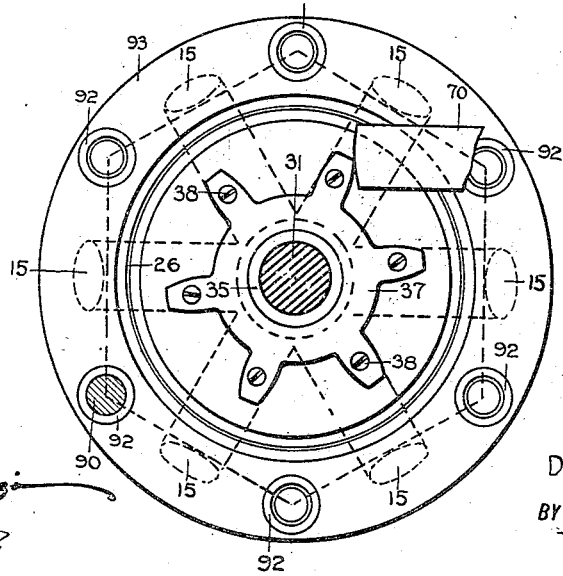
WITNESSES
INVENTOR
David Wilson Wood
BY
ATTORNEYS

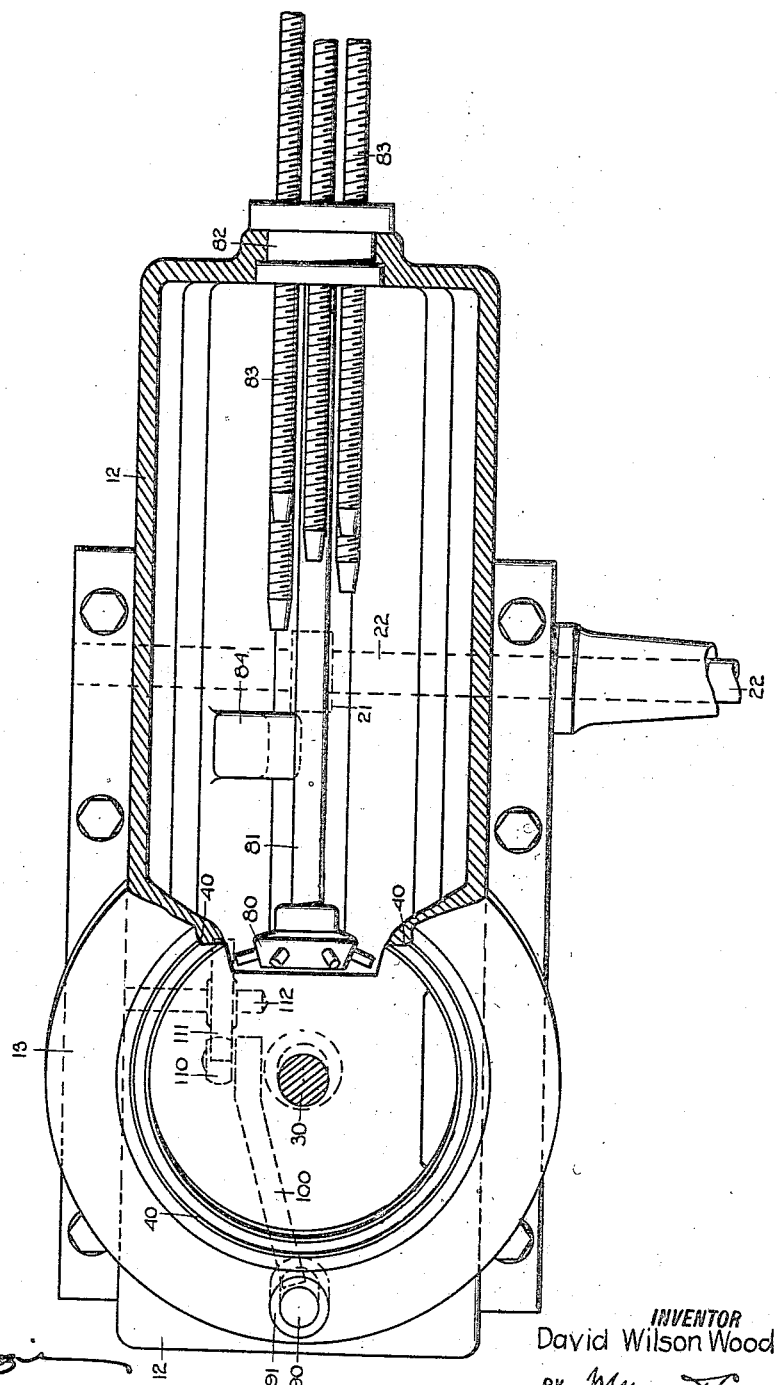

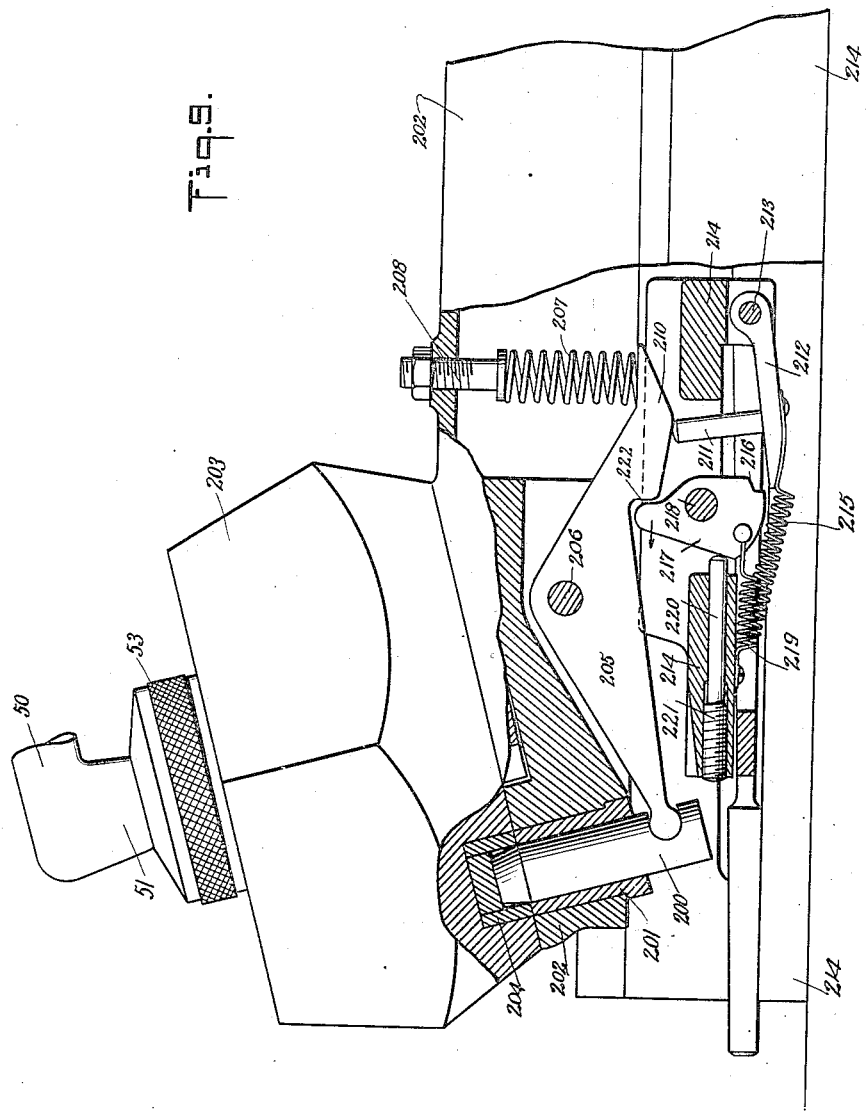

UNITED STATES PATENT OFFICE.

DAVID WILSON WOOD, OF BRAZIL, INDIANA.

TURRET-MACHINE.

1,288,351.　　　　　Specification of Letters Patent.　　Patented Dec. 17, 1918.

Application filed December 28, 1917. Serial No. 209,290.

*To all whom it may concern:*

Be it known that I, DAVID WILSON WOOD, a citizen of the United States, and a resident of Brazil, in the county of Clay and State of Indiana, have invented a new and Improved Turret-Machine, of which the following is a full, clear, and exact description.

The invention relates to lathes, drill presses, drilling machines and similar machines using a turret and stop rods such, for instance, as shown and described in Letters Patent of the United States for a stop mechanism, granted to me November 6, 1917, No. 1,245,658.

The object of the invention is to provide a new and improved turret machine arranged to eliminate all lost motion in the revolving turret head especially when doing heavy work. Another object is to allow free turning of the turret head on the reciprocating slide. Another object is to hold the turret head against accidental turning even should the operator fail to bind the head in place on the slide. A further object is to permit of taking up any wear of the turret head on its pivot pin without changing the alinement. Still another object is to extend the locking means for the turret head outward beyond the base of the tool to eliminate inaccuracy in turning the head from one position to another and to insure correct locking of the head at each one-sixth turn of the head.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Fig. 3 is an enlarged sectional side elevation of the same on the line 3—3 of Fig. 6;

Fig. 4 is a similar view of the same on the line 4—4 of Fig. 6;

Fig. 5 is a similar view of the same on the line 5—5 of Fig. 6;

Fig. 6 is a cross section of the same on the line 6—6 of Fig. 3;

Fig. 7 is an inverted plan view of the turret head with the pivot thereof in section;

Fig. 8 is a plan view of the slide and saddle with part of the slide shown in section.

Fig. 9 is a sectional side elevation of a modified form of the locking device for the turret head.

Figure 1:
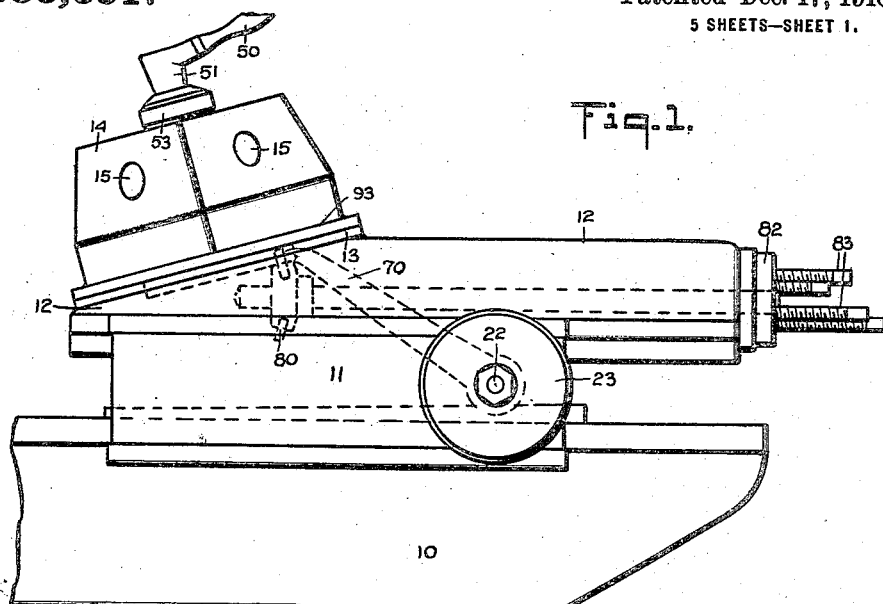
Figure 1 is a side elevation of the turret head in position on a slide mounted to reciprocate on a saddle fixed to the bed of the machine on which the turret is used.
Figure 2:
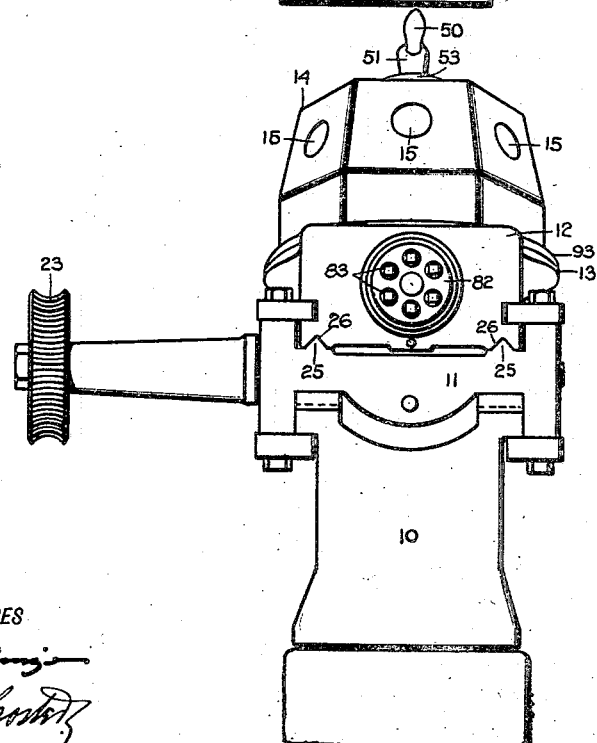
Fig. 2 is a rear end elevation of the same.

On the bed 10 of a machine on which the turret is used is adjustably fastened a saddle 11, on which is mounted to reciprocate a slide 12 having an angular face 13 on which is seated the bottom of a turret head 14, preferably made hexagonal, and provided at each side with a tool seat or socket 15 for supporting a corresponding tool. In order to impart a forward and backward sliding movement to the turret slide 12, use is made of a rack 20 attached to the turret slide (see Fig. 3) and extending lengthwise thereof. A pinion 21 is in mesh with the rack 20 and is secured on a transversely extending shaft 22 journaled in suitable bearings arranged on the saddle 11. When the shaft 22 is turned forward and backward alternately in the usual manner then a forward and backward sliding movement is given to the turret slide 12. As shown in the drawings, the shaft 22 is provided at one outer end with a driving wheel 23 adapted to be turned by the usual driving mechanism to impart an alternate forward and backward sliding movement to the slide 12. In order to provide an easy sliding movement of the turret slide 12, the saddle 11 is provided with longitudinally extending V-shaped guideways 25 engaged by correspondingly shaped grooves 26 formed on the under side of the slide 12 (see Figs. 2 and 6).

The turret head 14 is mounted to turn on a pivot pin 30 provided with a tapering portion 31, the lower part of which fits into a correspondingly shaped bore 32 formed in the slide 12 at right angles to the face 13 thereof (see Fig. 3). A nut 33 screws on the lower threaded end 34 of the pivot pin 30 to fasten the same in place in the slide 12. On the upper part of the tapering portion 31 of the pivot pin 30 fits the conical portion of a bushing 35 on which is mounted to turn the hub 36 of a gear wheel 37 secured by screws 38 or other fastening means to the under side of the turret head 14 (see Fig. 7). In case of undue wear between the contacting surfaces of the hub 36 and the bushing 35 it is only necessary on removal of the pivot pin 30 and head 14 to drive the bushing 35 a short distance farther up on the tapering portion 31 of the pivot pin to expand the bushing 35 sufficiently to insure again a snug fit on the hub 36. The head and its pivot pin are then replaced in position on the slide 12, and it will be noticed that the same alinement of the head 14 relative to the face 13 is maintained owing to the fact that the pivot pin is re-secured in the same position in the slide 12.

In order to relieve the pivot pin 30 of undue strain and to prevent lost motion when doing heavy work, the face 13 of the slide 12 is provided with an annular V-shaped guideway 40 engaged by a correspondingly shaped groove 41 formed in the bottom of the turret head 14.

The turret head 14 is usually bound in place on the face 13 of the slide 12 by the use of the usual handle 50 terminating in a nut 51 screwing in the upper threaded end 52 of the pivot 30, the nut 51 abutting against a binding collar 53 to engage the top of the turret head 14. On turning the handle 50 in one direction, the turret head 14 is unclamped, and when turning it in an opposite direction the turret head 14 is firmly clamped in position on the face 13 of the slide 12. In order, however, to hold the turret head 14 against accidental turning even should the operator fail to turn the handle 50 with a view to clamp the turret head 14 in place, use is made of the following arrangement: A ball race 60 is mounted in the turret head 14 and is engaged by balls 61 which in turn are engaged by a ball race 62 screwing on the threaded portion 52 of the pivot 30. The ball race 62 is fastened in place by a nut 63 screwing on the threaded portion 52 of the pivot 30 and contained within the binding collar 53.

It is understood that in the ordinary type of turret lathe construction the adjustment of the turret or "the holding down" scheme is by means of a nut on the center bolt and which is tightened against a flat or taper plate and bears in a recess in the top of the turret. This plate bearing metal to metal face causes quite a bit of friction and is sometimes equal to or greater than the friction between the turret and slide.

By using a ball bearing in place of the flat or taper plate the adjusting nut can be tightened much more and not cause the head to revolve any harder than the flat or plain type, owing to the fact that the friction created in the top bearing is reduced to a minimum and the power required to overcome the friction of the common plain type can now be used to offset the extra friction which was caused by increasing the pressure with the adjusting nut.

It can readily be seen that this turret is held to its seat by possibly twice the pressure of the average turret lathe and still be revolved as easily as the other makes.

If the operator neglects to tighten the top clamp handle at each indexing this construction will take care of the average cut without bringing undue strain on the locking pin and center bolt because of the simple reason that the turret is already firmly held against its seat and does not depend on the index mechanism to keep it from having a rotary motion.

The turret head 14 during its return movement is given one-sixth of a turn by an arm 70 fulcrumed loosely on the shaft 22 and extending with its free end into the path of one of the teeth of the wheel 37 attached to the under side of the turret 14 (see Figs. 5, 6 and 7). The arm 70 is held in its normal position by a suitable spring 71 and during the forward movement of the slide 12 the free end of the arm 70 abuts against the under side of the top of the slide 12. The wheel 37 is in mesh with a pinion 80 secured to the forward end of a shaft 81 carrying a head 22 in which the stop rods 83 are adjustably secured in the usual manner, it being understood that one of the stop rods at the time is adapted to abut against a fixed lug 84 forming part of the saddle 11 to limit the forward sliding movement of the slide 12.

After the turret head 14 is given one-sixth of a turn by the arm 70 engaging the wheel 37 the turret head is locked in place against turning by a locking pin 90 mounted to slide in a bushing 91 attached to the forward end of the slide 12, as plainly shown in Fig. 4. The upper tapering end of the locking pin 90 engages a correspondingly shaped bore of one of a series of rings 92 fastened in the bottom of the turret head 14, one for each side thereof. The turret head 14 is provided with an outwardly extended base 93 in which the rings 92 are located thus arranging the locking device beyond the sockets 15 for the tools to insure an accurate locking of the turret head 14 and eliminate inaccuracy of the position of the tool relative to the work. The lower end of the locking pin 90 is engaged by the forward end of a lever 100 fulcrumed at 101 in a bracket 102 attached by a screw or other means 103 to the slide 12. The rear end of the lever 100 is pressed on by a cap 104 mounted to slide in a recess 105 formed in the slide 12. A spring 106 engages the cap 104 and forces the same downward and the spring rests with its upper end on a screw 107 screwed into the slide 12. The screw 107 is provided with a shank 108 extending into the opening of the spring 106 to hold the latter in central position relative to the cap 104. On the rear end of the lever 100 is mounted a roller 110 adapted to engage a cam 111, preferably of disk shape, with a portion cut out, as plainly indicated in Fig. 4. The cam 111 is mounted to turn on a stud 112 held in the saddle 11, and the cam 111 is pressed on by a spring 113 to hold the cam in the path of the roller 110. When the slide 12 moves rearwardly then the roller 110 comes in contact with the cam 111 whereby a swinging motion is given to the lever 100 and the latter now withdraws the pin 90 from the foremost ring 92 of the turret head 14, thus unlocking the latter and allowing the turret head now to be turned by the action of the arm 70 which at this time engages the wheel 37. The rotary motion given to the wheel 37 causes a turning of the stop head 82 to move another stop 83 into active position relative to the fixed lug 84. As soon as the turret head 14 has been given one-sixth of a revolution, then the locking pin 90 immediately snaps into the next following ring 92 to securely lock the turret head 14 against accidental turning during the subsequent forward movement.

It is understood that during the forward movement of the slide 12 the friction roller 110 rides over the flat portion of the cam 111 thus turning the latter a short distance to allow the friction roller to pass. When this has been done the cam 111 is returned to its normal position by its spring 113 to again act on the roller 110 at the next return or forward movement of the slide 12.

It is also understood that the spring 106 is stronger than the spring 113 and consequently the pin 90 remains in locking position during the return movement of the slide 12 and while the roller 110 turns the cam 111.

In the modified form of the turret head locking device shown in Fig. 9, the locking pin 200 is mounted to slide in a bushing 201 attached to the forward end of the slide 202 on which the turret head 203 is mounted to turn. The upper tapering end of the locking pin 200 engages one of a series of rings 204 fastened in the bottom of the turret head 203, one for each side thereof. The lower end of the locking pin 200 is engaged by the forward end of a lever 205 fulcrumed at 206 on the slide 202. The rear end of the lever 205 is pressed on by the lower end of a spring 207 abutting with its upper end against an adjusting screw 208 screwing in the slide 202 to permit of regulating the tension of the spring 207. The rear end of the lever 205 is provided with a cam 210 engaging a trip pin 211 held on a latch 212 fulcrumed at 213 on the saddle 214. The latch 212 is pressed upward by a spring 215 and the free forward end of the latch 212 is adapted to engage a shoulder 216 formed on the trip dial 217 having a shaft 218 journaled in suitable bearings arranged on the saddle 214. A spring 219 connects the saddle 214 with the trip dial 217 to hold the latter against a stop pin 220 having a threaded portion 221 screwing in the saddle 214 to permit of adjusting the stop pin 220. The cam 210 is V-shaped at the under side and the forward end of the cam terminates in an abrupt shoulder 222 to allow a quick return swinging motion of the lever 205.

When the slide 202 moves forward, the locking pin 200 is in locking position in one of the rings 204 to hold the turret head 203 against turning. When the slide 202 moves rearward then the cam 210 of the lever 205 comes in contact with the trip dial 217 whereby a swinging motion is given to the lever 205, and the latter now withdraws the locking pin 200 from the ring 204 to allow turning of the turret head 203, as above explained. It is understood that the trip dial 217 is held against turning in one direction by the latch 212 and in the opposite direction by the stop pin 220 during the time a swinging motion is given to the lever 205, as above explained, and when the slide finally reaches its rearmost position the abrupt shoulder 222 of the lever 205 drops out of engagement with the upper end of the trip dial 217, and a quick return swinging motion is now given to the lever 205 by the action of the spring 207 to engage the locking pin 200 with the next ring 204 and thereby again lock the turret head 203 against turning during the next forward movement. When the slide 202 moves into rearmost position, as shown in Fig. 9, the cam end 210 of the lever 205 presses the pin 211 downward whereby the latch 212 is disengaged from the trip dial 217 and the latter is now free to swing forward, as indicated by the arrow, by the action of the lever 205 without disturbing the position of the said lever 205.

From the foregoing it will be seen that by this automatic locking mechanism, the locking pin on being disengaged from the turret head cannot scar the bearing face of the turret head. It will also be noticed that when the bushing 201 and the ring 204 are in register and the trip dial 217 is released by the latch 212, and the shoulder 222 is free of the trip dial 217, then the spring 207 can exert its full power to swing the lever 205 back and to re-engage the locking pin 200 with a ring 204.

Having thus described my invention, I claim as new and desire to secure by Letters Patent:—

1. In a turret machine, a slide provided with a pivot pin having a threaded stem, a turret head mounted to turn on the said pivot pin, a hollow binding collar on the turret and through which the threaded stem of the pivot pin projects, a ball bearing having ball races with balls intermediate the races, one of the ball races being held on the said turret head and the other ball race fitting on the said stem, and a nut screwing on the said stem in the binding collar and bearing against the ball race held thereon.

2. In a turret machine, a saddle provided with a stop, a slide on the saddle, a turret head mounted to turn on the slide and provided on its underside with a gear wheel, a shaft mounted in the slide and having a pinion engaging the gear wheel, a stop head carried by the shaft and provided with stop rods for engaging the stop of the saddle, and means for rotating the turret head upon the rearward movement of the slide.

3. In a turret machine, a saddle provided with a stop, a slide mounted to slide forward and backward on the said saddle, a turret head mounted to turn on the said slide and provided on its under side with a gear wheel, a stop head mounted to revolve on the said slide and provided with stop rods, a shaft carrying the said stop head and provided with a pinion in mesh with the said gear wheel, and a stationary arm adapted to be engaged by the said gear wheel on the slide moving into rearward position to rotate the gear wheel and with it the said turret head and the said stop head.

4. In a turret machine, a saddle provided with a stop, a slide mounted to slide forward and backward on the said saddle, a turret head mounted to turn on the said slide and provided on its under side with a gear wheel, a stop head mounted to revolve on the said slide and provided with stop rods, a shaft carrying the said stop head and provided with a pinion in mesh with the said gear wheel, a rack on the said slide, a pinion in mesh with the said rack, a pilot shaft carrying the said pinion and journaled in the said saddle, and a spring-pressed arm fulcrumed loosely on the said pilot shaft and extending with its free end into the path of the said gear wheel on the turret head.

5. In a turret machine, a saddle provided with a stop, a slide mounted to slide forward and backward on the said saddle, a turret head mounted to turn on the said slide and provided on its under side with a gear wheel, a stop head mounted to revolve on the said slide and provided with stop rods, a shaft carrying the said stop head and provided with a pinion in mesh with the said gear wheel, a rack on the said slide, a pinion in mesh with the said rack, a pilot shaft carrying the said pinion and journaled in the said saddle, and a spring-pressed arm fulcrumed loosely on the said pilot shaft and extending with its free end into the path of the said gear wheel on the turret head, the free end of the said arm being adapted to abut against the under side of the top of the slide during the forward movement thereof.

6. In a turret machine, a saddle, a slide mounted to reciprocate on the said saddle, a turret head mounted to turn on the said slide, a locking pin mounted to slide on the said slide and adapted to engage and lock the said turret head against turning during the forward movement of the slide, a spring actuated lever fulcrumed on the slide and engaging the said locking pin, a trip dial mounted to swing on the said saddle and normally projecting into the path of the rear end of the said lever to impart a swinging motion to the said lever and thereby move the locking pin out of engagement with the turret head, and means controlled by the lever for holding the trip dial stationary at the time it imparts a swinging movement to the lever 7. In a turret machine, a saddle, a slide mounted to reciprocate on the said saddle, a turret head mounted to turn on the said slide, a locking pin mounted to slide on the said slide and adapted to engage and lock the said turret head against turning during the forward movement of the slide, a spring actuated lever fulcrumed on the slide and engaging the said locking pin, the rear end of the lever being provided with a cam and with an abrupt shoulder, a trip dial mounted to swing on the said saddle and adapted to be engaged by the said cam and the said shoulder of the said lever to impart a swinging motion to the lever and thereby move the locking pin out of engagement with the turret head and to allow a quick return swinging motion of the lever after the turret head is turned to again engage the locking pin with the turret head, and means controlled by the lever for holding the trip dial stationary at the time it imparts a swinging movement to the lever.

8. In a turret machine, a saddle, a slide mounted to reciprocate in the said saddle, a turret head mounted to turn on the said slide, a spring actuated locking pin mounted to slide on the said slide and adapted to engage and lock the said turret head against turning during the forward movement of the slide, a lever fulcrumed on the slide and engaging the said locking pin, the rear end of the lever being provided with a cam and with an abrupt shoulder, a trip dial mounted to swing on the said saddle and adapted to be engaged by the cam and the said shoulder of the said lever to impart a swinging motion to the lever and thereby move the locking pin out of engagement with the turret head and to allow a quick return swinging motion of the lever after the turret head is turned to again engage the locking pin with the turret head, and a spring pressed catch for the said trip dial and mounted on the said saddle, the said catch being adapted to be engaged by the cam of the said lever to move the catch out of engagement with the trip dial.

9. In a turret machine, a saddle, a slide mounted to reciprocate on the said saddle, a turret head mounted to turn on the said slide, a spring actuated locking pin mounted to slide on the said slide and adapted to engage and lock the said turret head against turning during the forward movement of the slide, a lever fulcrumed on the slide and engaging the said locking pin, the rear end of the lever being provided with a cam and with an abrupt shoulder, a trip dial mounted to swing on the said saddle and adapted to be engaged by the cam and the said shoulder of the said lever to impart a swinging motion to the lever and thereby move the locking pin out of engagement with the turret head and to allow a quick return swinging motion of the lever after the turret head is turned to again engage the locking pin with the turret head, and a stop pin adjustably mounted on the said saddle and engaging the said trip dial.

DAVID WILSON WOOD.